US009298514B2

(12) United States Patent
Jackson

(10) Patent No.: US 9,298,514 B2
(45) Date of Patent: Mar. 29, 2016

(54) SYSTEM AND METHOD FOR ENFORCING FUTURE POLICIES IN A COMPUTE ENVIRONMENT

(71) Applicant: Adaptive Computing Enterprises, Inc., Provo, UT (US)

(72) Inventor: David Brian Jackson, Spanish Fork, UT (US)

(73) Assignee: Adaptive Computing Enterprises, Inc., Provo, UT (US)

( * ) Notice: Subject to any disclaimer, the term of this patent is extended or adjusted under 35 U.S.C. 154(b) by 282 days.

(21) Appl. No.: 13/914,865

(22) Filed: Jun. 11, 2013

(65) Prior Publication Data

US 2013/0346995 A1 Dec. 26, 2013

Related U.S. Application Data

(63) Continuation of application No. 13/362,243, filed on Jan. 31, 2012, now Pat. No. 8,464,266, which is a continuation of application No. 10/530,575, filed as application No. PCT/US2005/008299 on Mar. 11, 2005, now Pat. No. 8,108,869.

(51) Int. Cl.

| | |
|---|---|
| ***G06F 9/50*** | (2006.01) |
| ***G06F 9/46*** | (2006.01) |
| ***G06F 21/62*** | (2013.01) |

(52) U.S. Cl.

CPC ............ *G06F 9/5061* (2013.01); *G06F 9/5072* (2013.01); *G06F 21/6218* (2013.01); *G06F 2221/2141* (2013.01)

(58) Field of Classification Search

None

See application file for complete search history.

(56) References Cited

U.S. PATENT DOCUMENTS

| | | | | |
|---|---|---|---|---|
| 5,473,773 | A | 12/1995 | Aman et al. | |
| 5,504,894 | A | 4/1996 | Ferguson et al. | |
| 6,101,508 | A | 8/2000 | Wolf | |
| 6,466,559 | B1 | 10/2002 | Johansson et al. | |
| 6,704,489 | B1 | 3/2004 | Kurauchi et al. | |
| 7,685,597 | B1 * | 3/2010 | Czajkowski et al. | 718/100 |
| 7,778,888 | B2 | 8/2010 | Daur et al. | |
| 2002/0120741 | A1 | 8/2002 | Webb et al. | |
| 2003/0233446 | A1 | 12/2003 | Earl | |
| 2004/0139202 | A1 | 7/2004 | Talwar et al. | |
| 2004/0199918 | A1 | 10/2004 | Skovira | |
| 2004/0244006 | A1 | 12/2004 | Kaufman et al. | |
| 2005/0149370 | A1 | 7/2005 | Brown | |
| 2005/0278760 | A1 | 12/2005 | Dewar et al. | |
| 2006/0179106 | A1 | 8/2006 | Turner et al. | |
| 2006/0250977 | A1 | 11/2006 | Gao et al. | |
| 2009/0285204 | A1 * | 11/2009 | Gallant et al. | 370/352 |

* cited by examiner

*Primary Examiner* — Eric C Wai

(57) ABSTRACT

A disclosed system receives a request for resources, generates a credential map for each credential associated with the request, the credential map including a first type of resource mapping and a second type of resource mapping. The system generates a resource availability map, generates a first composite intersecting map that intersects the resource availability map with a first type of resource mapping of all the generated credential maps and generates a second composite intersecting map that intersects the resource availability map and a second type of resource mapping of all the generated credential maps. With the first and second composite intersecting maps, the system can allocate resources within the compute environment for the request based on at least one of the first composite intersecting map and the second composite intersecting map.

20 Claims, 8 Drawing Sheets

100
102
GRID SCHEDULER
CLUSTER SCHEDULER
104A
CLUSTER SCHEDULER
104B
CLUSTER SCHEDULER
104C
RESOURCE MANAGER
106A
RESOURCE MANAGER
106B
RESOURCE MANAGER
106C
NODE
108A
NODE
108B
NODE
108C
NODE
108D
NODE
108E
NODE
108F
NODE
108G
NODE
108H
NODE
108I
110
112
114

114
ACL
112
NODE 1
NODE 2
NODE 3
NODE 4
RESOURCE SET
120
110
TIME 202
204A
204B
204C 206A
206B
206C
210
212A
212B
212C
212D
208A
208B
208C
208D 302
304
J
314
N
T-D
306
DYNAMIC
ACL
308
USER
310
J
314
Q
SCHEDULER
104A

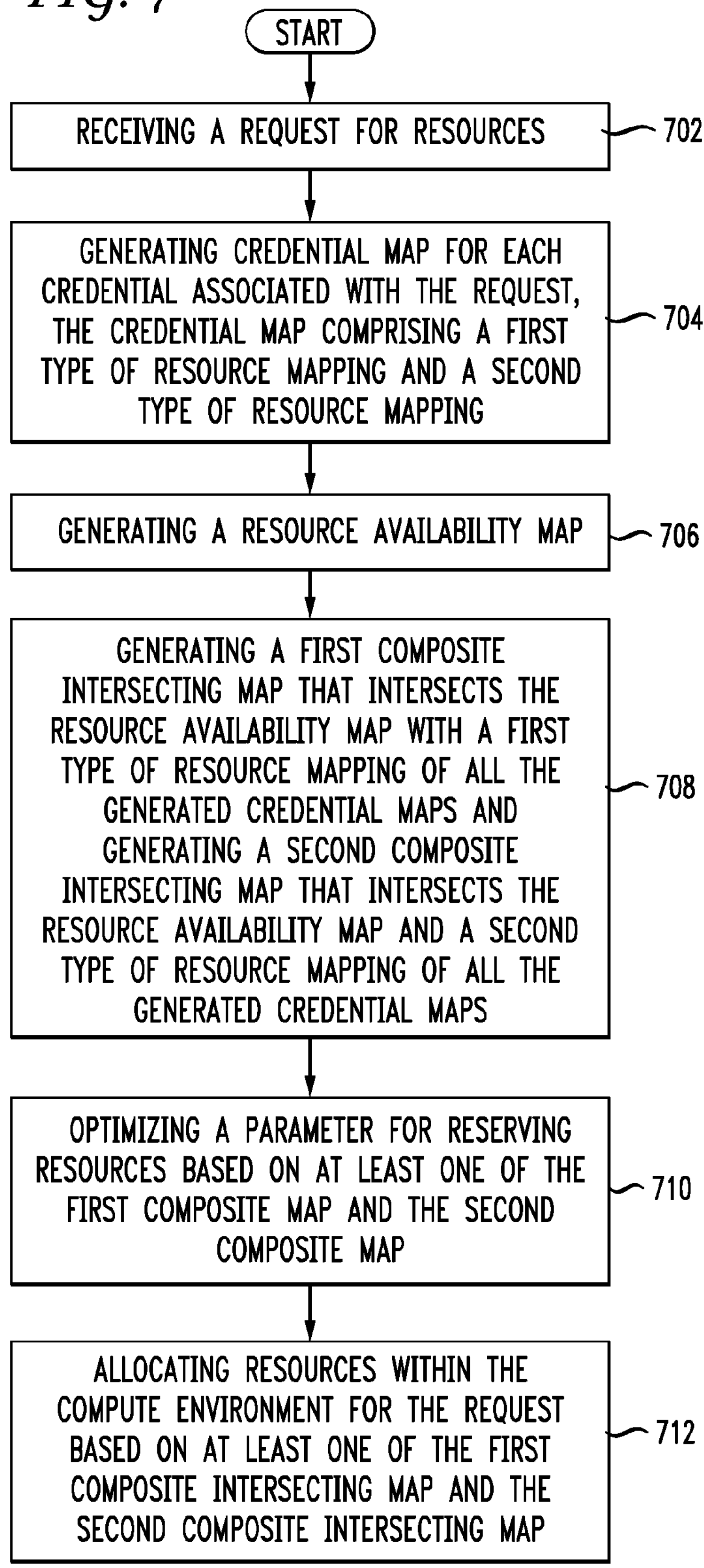
FIG. 7
START
RECEIVING A REQUEST FOR RESOURCES
702
GENERATING CREDENTIAL MAP FOR EACH CREDENTIAL ASSOCIATED WITH THE REQUEST, THE CREDENTIAL MAP COMPRISING A FIRST TYPE OF RESOURCE MAPPING AND A SECOND TYPE OF RESOURCE MAPPING
704
GENERATING A RESOURCE AVAILABILITY MAP
706
GENERATING A FIRST COMPOSITE INTERSECTING MAP THAT INTERSECTS THE RESOURCE AVAILABILITY MAP WITH A FIRST TYPE OF RESOURCE MAPPING OF ALL THE GENERATED CREDENTIAL MAPS AND GENERATING A SECOND COMPOSITE INTERSECTING MAP THAT INTERSECTS THE RESOURCE AVAILABILITY MAP AND A SECOND TYPE OF RESOURCE MAPPING OF ALL THE GENERATED CREDENTIAL MAPS
708
OPTIMIZING A PARAMETER FOR RESERVING RESOURCES BASED ON AT LEAST ONE OF THE FIRST COMPOSITE MAP AND THE SECOND COMPOSITE MAP
710
ALLOCATING RESOURCES WITHIN THE COMPUTE ENVIRONMENT FOR THE REQUEST BASED ON AT LEAST ONE OF THE FIRST COMPOSITE INTERSECTING MAP AND THE SECOND COMPOSITE INTERSECTING MAP
712

SYSTEM AND METHOD FOR ENFORCING FUTURE POLICIES IN A COMPUTE ENVIRONMENT

RELATED APPLICATIONS

The present application is a continuation of U.S. patent application Ser. No. 13/362,243, filed Jan. 31, 2012, which is a continuation of U.S. patent application Ser. No. 10/530,575, filed Mar. 11, 2005, which is a national phase application of PCT/US05/008299, filed Mar. 11, 2005, the content of which are incorporated herein by reference in their entirety.

The present application is related to U.S. patent application Ser. No. 10/530,583; U.S. patent application Ser. No. 10/530,582; U.S. patent application Ser. No. 10/530,581; U.S. patent application Ser. No. 10/530,577; U.S. patent application Ser. No. 10/530,576; U.S. patent application Ser. No. 10/589,339; U.S. patent application Ser. No. 10/530,578; and U.S. patent application Ser. No. 10/530,580, filed on the same day as the present application. The content of each of these cases is incorporated herein by reference.

BACKGROUND OF THE INVENTION

1. Field of the Invention

The present invention relates to managing policies for access to resources within a compute environment such as a cluster or a grid and more specifically to a system and method of managing and enforcing future policies within the compute environment.

2. Introduction

There are challenges in the complex process of managing the consumption of resources within a compute environment such as a grid, compute farm or cluster of computers. Grid computing may be defined as coordinated resource sharing and problem solving in dynamic, multi-institutional collaborations. Many computing projects require much more computational power and resources than a single computer may provide. Networked computers with peripheral resources such as printers, scanners, I/O devices, storage disks, scientific devices and instruments, etc. may need to be coordinated and utilized to complete a task. The term compute resource generally refers to computer processors, network bandwidth, and any of these peripheral resources as well. A compute farm may comprise a plurality of computers coordinated for such purposes of handling Internet traffic. The web search website Google® had a compute farm used to process its network traffic and Internet searches.

Grid/cluster resource management generally describes the process of identifying requirements, matching resources to applications, allocating those resources, and scheduling and monitoring grid resources over time in order to run grid applications or jobs submitted to the compute environment as efficiently as possible. Each project or job will utilize a different set of resources and thus is typically unique. For example, a job may utilize computer processors and disk space, while another job may require a large amount of network bandwidth and a particular operating system. In addition to the challenge of allocating resources for a particular job or a request for resources, administrators also have difficulty obtaining a clear understanding of the resources available, the current status of the compute environment and available resources, and real-time competing needs of various users. One aspect of this process is the ability to reserve resources for a job. A cluster manager will seek to reserve a set of resources to enable the cluster to process a job at a promised quality of service.

The reservation of resources will also be in compliance with user or group credentials. For example, a user may be limited to the use of 10 processors per job or 10 processors at any given time. Other credentials may be limits related to an earliest start time, a certain quality of service, and so forth. A group such as a science or marketing department may be limited as to the number of processors it may use at any given time. As reservations of resources are made, the system not only must identify available resources but must make reservations consistent with the limits on each particular user or group of users.

General background information on clusters and grids may be found in several publications. See, e.g., *Grid Resource Management, State of the Art and Future Trends*, Jarek Nabrzyski, Jennifer M. Schopf, and Jan Weglarz, Kluwer Academic Publishers, 2004; and *Beowulf Cluster Computing with Linux*, edited by William Gropp, Ewing Lusk, and Thomas Sterling, Massachusetts Institute of Technology, 2003.

It is generally understood herein that the terms grid and cluster are interchangeable, although they have different connotations. For example, when a grid is referred to as receiving a request for resources and the request is processed in a particular way, the same method may also apply to other compute environments such as a cluster or a compute farm. A cluster is generally defined as a collection of compute nodes organized for accomplishing a task or a set of tasks. In general, a grid will comprise a plurality of clusters as will be shown in FIG. 1A. Several general challenges exist when attempting to maximize resources in a grid. First, there are typically multiple layers of grid and cluster schedulers. A grid 100 generally comprises a group of clusters or a group of networked computers. The definition of a grid is very flexible and may mean a number of different configurations of computers. The introduction here is meant to be general given the variety of configurations that are possible. A grid scheduler 102 communicates with a plurality of cluster schedulers 104A, 104B and 104C. Each of these cluster schedulers communicates with a respective resource manager 106A, 106B or 106C. Each resource manager communicates with a respective series of compute resources shown as nodes 108A, 108B, 108C in cluster 110, nodes 108D, 108E, 108F in cluster 112 and nodes 108G, 108H, 108I in cluster 114.

Local schedulers (which may refer to either the cluster schedulers 104 or the resource managers 106) are closer to the specific resources 108 and may not allow grid schedulers 102 direct access to the resources. The grid level scheduler 102 typically does not own or control the actual resources. Therefore, jobs are submitted from the high level grid-scheduler 102 to a local set of resources with no more permissions that then user would have. This reduces efficiencies and can render the reservation process more difficult.

The heterogeneous nature of the shared compute resources also causes a reduction in efficiency. Without dedicated access to a resource, the grid level scheduler 102 is challenged with the high degree of variance and unpredictability in the capacity of the resources available for use. Most resources are shared among users and projects and each project varies from the other. The performance goals for projects differ. Grid resources are used to improve performance of an application but the resource owners and users have different performance goals: from optimizing the performance for a single application to getting the best system throughput or minimizing response time. Local policies may also play a role in performance.

Within a given cluster, there is only a concept of resource management in space. An administrator can partition a cluster and identify a set of resources to be dedicated to a particular purpose and another set of resources can be dedicated to another purpose. In this regard, the resources are reserved in advance to process the job. There is currently no ability to identify a set of resources over a time frame for a purpose. By being constrained in space, the nodes 108A, 108B, 108C, if they need maintenance or for administrators to perform work or provisioning on the nodes, have to be taken out of the system, fragmented permanently or partitioned permanently for special purposes or policies. If the administrator wants to dedicate them to particular users, organizations or groups, the prior art method of resource management in space causes too much management overhead requiring a constant adjustment the configuration of the cluster environment and also losses in efficiency with the fragmentation associated with meeting particular policies.

To manage the jobs submissions or requests for resources within a cluster, a cluster scheduler will employ reservations to insure that jobs will have the resources necessary for processing. FIG. 1B illustrates a cluster/node diagram for a cluster 124 with nodes 120. Time is along the X axis. An access control list 114 (ACL) to the cluster is static, meaning that the ACL is based on the credentials of the person, group, account, class or quality of service making the request or job submission to the cluster. The ACL 114 determines what jobs get assigned to the cluster 110 via a reservation 112 shown as spanning into two nodes of the cluster. Either the job can be allocated to the cluster or it can't and the decision is determined based on who submits the job at submission time. The deficiency with this approach is that there are situations in which organizations would like to make resources available but only in such a way as to balance or meet certain performance goals. Particularly, groups may want to establish a constant expansion factor and make that available to all users or they may want to make a certain subset of users that are key people in an organization and want to give them special services but only when their response time drops below a certain threshold. Given the prior art model, companies are unable to have the flexibility over their cluster resources.

As resources are reserved in the future for jobs submitted by a person or a group, there are challenges in the process where not all available resources may be known for a given set of constraints such that the reservation may be made at an optimal time for the submitter. Constraints on the use of resources may relate to such parameters as user or group privileges, resource use restraints, quality of service constraints and so forth. What is needed in the art is a system and method that enables an improved reservation of resources given known constraints.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The invention relates to a system, method and computer-readable medium, as well as grids and clusters managed according to the method described herein. An example embodiment relates to a method of processing a request for resources within a compute environment. The method is practiced by a system that contains modules configured or programmed to carry out the steps of the invention. The system receives a request for resources, generates a credential map for each credential associated with the request, the credential map comprising a first type of resource mapping and a second type of resource mapping. The system generates a resource availability map, generates a first composite intersecting map that intersects the resource availability map with a first type of resource mapping of all the generated credential maps and generates a second composite intersecting map that intersects the resource availability map and a second type of resource mapping of all the generated credential maps. With the first and second composite intersecting maps, the system can allocate resources within the compute environment for the request based on at least one of the first composite intersecting map and the second composite intersecting map. The allocations or reservation for the request can then be made in an optimal way for parameters such as the earliest time possible based on available resources and also that maintains the constraints on the requestor.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 7 illustrates a method embodiment of the invention.

DETAILED DESCRIPTION OF THE INVENTION

Figure 1A:
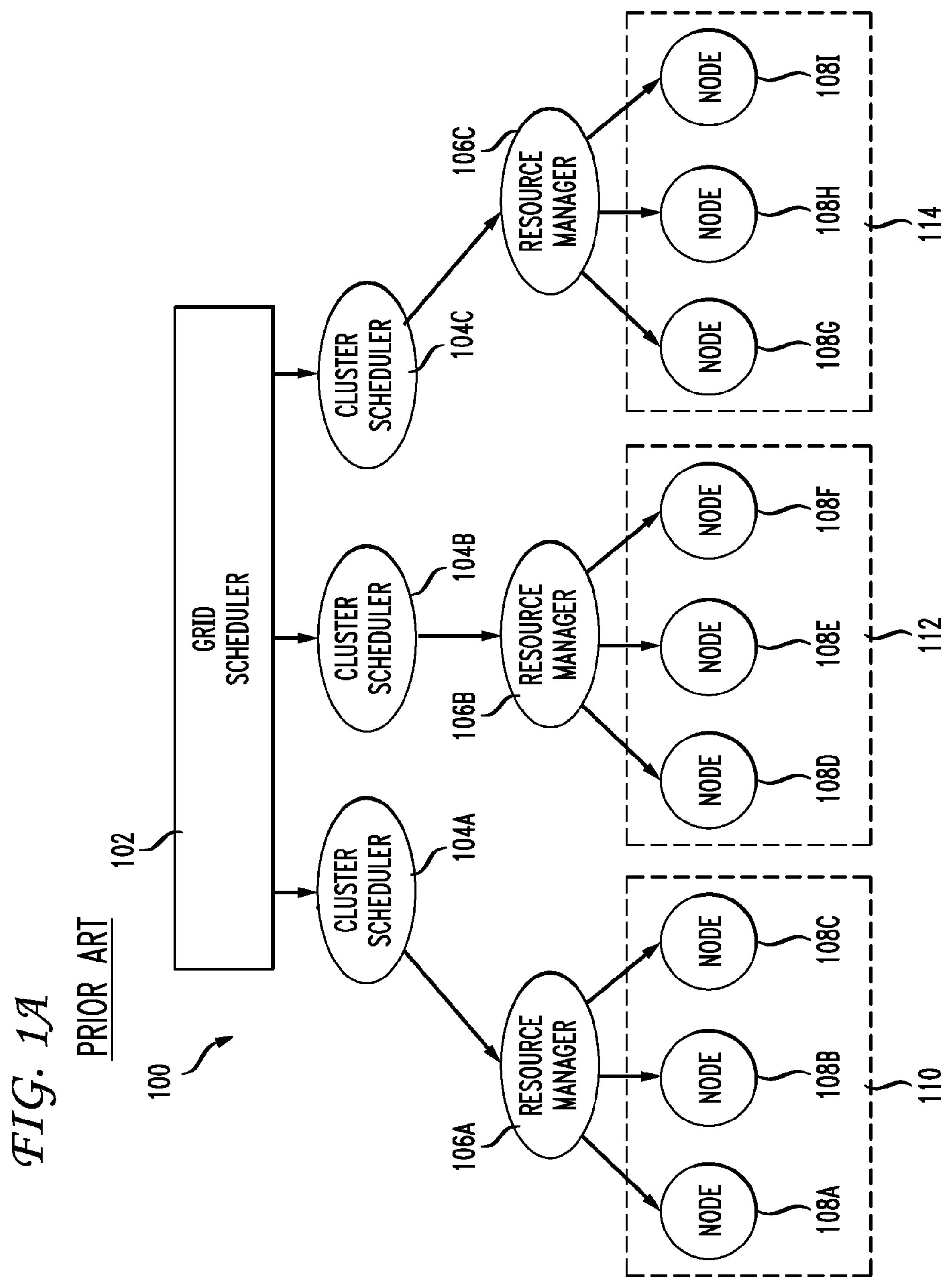
FIG. 1A illustrates generally a grid scheduler, cluster scheduler, and resource managers interacting with compute nodes within plurality of clusters.
Figure 1B:
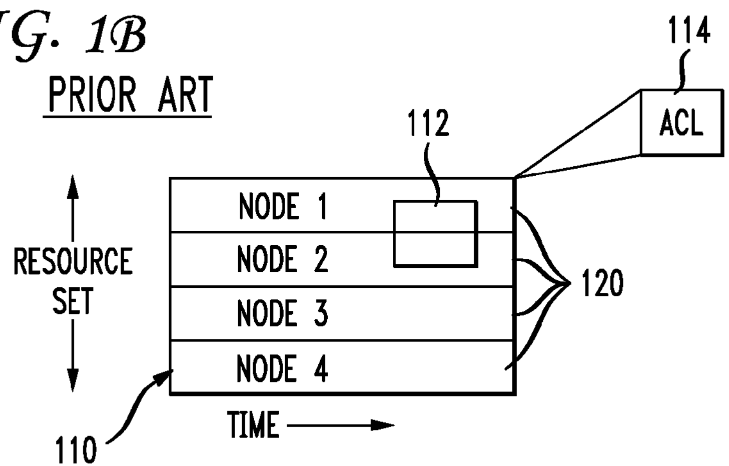
FIG. 1B illustrates an access control list which provides access to resources within a compute environment.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention. The claims in this application primarily focus on the disclosure associated with FIGS. 6 and 7.

The present invention relates to reservations of resources within the context of a compute environment. One example of a compute environment is a cluster. The cluster may be, for example, a group of computing devices operated by a hosting facility, a hosting center, a virtual hosting center, a data center, grid and/or utility-based computing environments. Every reservation consists of three major components: a set of resources, a timeframe, and an access control list (ACL).

Additionally, a reservation may also have a number of optional attributes controlling its behavior and interaction with other aspects of scheduling. A reservation's ACL specifies which jobs can use the reservation. Only jobs which meet one or more of a reservation's access criteria are allowed to use the reserved resources during the reservation timeframe. The reservation access criteria comprises, in one example, at least following: users, groups, accounts, classes, quality of service (QOS) and job duration. A job may be any venue or end of consumption of resource for any broad purpose, whether it be for a batch system, direct volume access or other service provisioning.

A workload manager, or scheduler, will govern access to the compute environment by receiving requests for reservations of resources and creating reservations for processing jobs. A workload manager functions by manipulating five primary, elementary objects. These are jobs, nodes, reservations, QOS structures, and policies. In addition to these, multiple minor elementary objects and composite objects are also utilized. These objects are also defined in a scheduling dictionary.

A workload manager may operate on a single computing device or multiple computing devices to manage the workload of a compute environment. The "system" embodiment of the invention may comprise a computing device that includes the necessary hardware and software components to enable a workload manager or a software module performing the steps of the invention. Such a computing device may include such known hardware elements as one or more central processors, random access memory (RAM), read-only memory (ROM), storage devices such as hard disks, communication means such as a modem or a card to enable networking with other computing devices, a bus that provides data transmission between various hardware components, a keyboard, a display, an operating system and so forth. There is no restriction that the particular system embodiment of the invention have any specific hardware components and any known or future developed hardware configurations are contemplated as within the scope of the invention when the computing device operates as is claimed.

Job information is provided to the workload manager scheduler from a resource manager such as Loadleveler, the Portable Batch System (PBS), Wiki or Platform's LSF products. Those of skill in the art will be familiar with each of these software products and their variations. Job attributes include ownership of the job, job state, amount and type of resources required by the job, required criteria (I need this job finished in 1 hour), preferred criteria (I would like this job to complete in ½ hour) and a wallclock limit, indicating how long the resources are required. A job consists of one or more requirements each of which requests a number of resources of a given type. For example, a job may consist of two requirements, the first asking for '1 IBM node with at least 512 MB of RAM' and the second asking for '24 IBM nodes with at least 128 MB of RAM'. Each requirement consists of one or more tasks where a task is defined as the minimal independent unit of resources. A task is a collection of elementary resources which must be allocated together within a single node. For example, a task may consist of one processor, 512 MB or memory, and 2 GB of local disk. A task may also be just a single processor. In symmetric multiprocessor (SMP) environments, however, users may wish to tie one or more processors together with a certain amount of memory and/or other resources. A key aspect of a task is that the resources associated with the task must be allocated as an atomic unit, without spanning node boundaries. A task requesting 2 processors cannot be satisfied by allocating 2 uni-processor nodes, nor can a task requesting 1 processor and 1 GB of memory be satisfied by allocating 1 processor on one node and memory on another.

A job requirement (or req) consists of a request for a single type of resources. Each requirement consists of the following components: (1) a task definition is a specification of the elementary resources which compose an individual task; (2) resource constraints provide a specification of conditions which must be met in order for resource matching to occur. Only resources from nodes which meet all resource constraints may be allocated to the job requirement; (3) a task count relates to the number of task instances required by the requirement; (4) a task List is a list of nodes on which the task instances have been located; and (5) requirement statistics are statistics tracking resource utilization.

As far as the workload manager is concerned, a node is a collection of resources with a particular set of associated attributes. In most cases, it fits nicely with the canonical world view of a node such as a PC cluster node or an SP node. In these cases, a node is defined as one or more CPU's, memory, and possibly other compute resources such as local disk, swap, network adapters, software licenses, etc. Additionally, this node will described by various attributes such as an architecture type or operating system. Nodes range in size from small uni-processor PC's to large SMP systems where a single node may consist of hundreds of CPU's and massive amounts of memory.

Information about nodes is provided to the scheduler chiefly by the resource manager. Attributes include node state, configured and available resources (i.e., processors, memory, swap, etc.), run classes supported, etc.

Policies are generally specified via a configuration file and serve to control how and when jobs start. Policies include, but are not limited to, job prioritization, fairness policies, fairshare configuration policies, and scheduling policies. Jobs, nodes, and reservations all deal with the abstract concept of a resource. A resource in the workload manager world is one of the following: (1) processors which are specified with a simple count value; (2) memory such as real memory or 'RAM' is specified in megabytes (MB); (3) swap which is virtual memory or 'swap' is specified in megabytes (MB); and (4) disk space such as a local disk is specified in megabytes (MB) or gigabytes (GB). In addition to these elementary resource types, there are two higher level resource concepts used within workload manager. These are the task and the processor equivalent (PE).

In a workload manager, jobs or reservations that request resources make such a request in terms of tasks typically using a task count and a task definition. By default, a task maps directly to a single processor within a job and maps to a full node within reservations. In all cases, this default definition can be overridden by specifying a new task definition. Within both jobs and reservations, depending on task definition, it is possible to have multiple tasks from the same job mapped to the same node. For example, a job requesting 4 tasks using the default task definition of 1 processor per task, can be satisfied by two dual processor nodes.

The concept of the PE arose out of the need to translate multi-resource consumption requests into a scalar value. It is not an elementary resource, but rather, a derived resource metric. It is a measure of the actual impact of a set of requested resources by a job on the total resources available system wide. It is calculated as:

PE=MAX(ProcsRequestedByJob/TotalConfiguredProcs,

MemoryRequestedByJob/TotalConfiguredMemory,

DiskRequestedByJob/TotalConfiguredDisk,

SwapRequestedByJob/TotalConfiguredSwap)*Total-ConfiguredProcs

For example, say a job requested 20% of the total processors and 50% of the total memory of a 128 processor MPP system. Only two such jobs could be supported by this system. The job is essentially using 50% of all available resources since the system can only be scheduled to its most constrained resource, in this case memory. The processor equivalents for this job should be 50% of the PE=64.

A further example will be instructive. Assume a homogeneous 100 node system with 4 processors and 1 GB of memory per node. A job is submitted requesting 2 processors and 768 MB of memory. The PE for this job would be calculated as:

PE=MAX(2/(100*4),768/(100*1024))*(100*4)=3.

This result makes sense since the job would be consuming ¾ of the memory on a 4 processor node. The calculation works equally well on homogeneous or heterogeneous systems, uni-processor or large way SMP systems.

A class (or queue) is a logical container object which can be used to implicitly or explicitly apply policies to jobs. In most cases, a class is defined and configured within the resource manager and associated with one or more of the attributes or constraints shown in Table 1 below.

TABLE 1

Attributes of a Class

| Attribute | Description |
|---|---|
| Default Job Attributes | A queue may be associated with a default job duration, default size, or default resource requirements |
| Host Constraints | A queue may constrain job execution to a particular set of hosts |
| Job Constraints | A queue may constrain the attributes of jobs which may submitted including setting limits such as max wallclock time, minimum number of processors, etc. |
| Access List | A queue may constrain who may submit jobs into it based on user lists, group lists, etc. |
| Special Access | A queue may associate special privileges with jobs including adjusted job priority. |

As stated previously, most resource managers allow full class configuration within the resource manager. Where additional class configuration is required, the CLASSCFG parameter may be used. The workload manager tracks class usage as a consumable resource allowing sites to limit the number of jobs using a particular class. This is done by monitoring class initiators which may be considered to be a ticket to run in a particular class. Any compute node may simultaneously support several types of classes and any number of initiators of each type. By default, nodes will have a one-to-one mapping between class initiators and configured processors. For every job task run on the node, one class initiator of the appropriate type is consumed. For example, a three processor job submitted to the class batch will consume three batch class initiators on the nodes where it is run.

Using queues as consumable resources allows sites to specify various policies by adjusting the class initiator to node mapping. For example, a site running serial jobs may want to allow a particular 8 processor node to run any combination of batch and special jobs subject to the following constraints:

only 8 jobs of any type allowed simultaneously no more than 4 special jobs allowed simultaneously To enable this policy, the site may set the node's MAXJOB policy to 8 and configure the node with 4 special class initiators and 8 batch class initiators. Note that in virtually all cases jobs have a one-to-one correspondence between processors requested and class initiators required. However, this is not a requirement and, with special configuration sites may choose to associate job tasks with arbitrary combinations of class initiator requirements.

In displaying class initiator status, workload manager signifies the type and number of class initiators available using the format [<CLASSNAME>:<CLASSCOUNT>]. This is most commonly seen in the output of node status commands indicating the number of configured and available class initiators, or in job status commands when displaying class initiator requirements.

Nodes can also be configured to support various arbitrary resources. Information about such resources can be specified using the NODECFG parameter. For example, a node may be configured to have "256 MB RAM, 4 processors, 1 GB Swap, and 2 tape drives".

We next turn to the concept of reservations. There are several types of reservations which sites typically deal with. The first, administrative reservations, are typically one-time reservations created for special purposes and projects. These reservations are created using a command that sets a reservation. These reservations provide an integrated mechanism to allow graceful management of unexpected system maintenance, temporary projects, and time critical demonstrations. This command allows an administrator to select a particular set of resources or just specify the quantity of resources needed. For example, an administrator could use a regular expression to request a reservation be created on the nodes 'blue0[1-9]' or could simply request that the reservation locate the needed resources by specifying a quantity based request such as 'TASKS==20'.

Figure 2A:
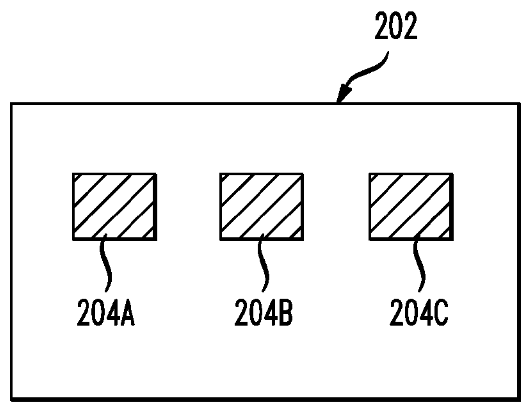
FIG. 2A illustrates a plurality of reservations made for compute resources.

Another type of reservation is called a standing reservation. This is shown in FIG. 2A. A standing reservation is useful for recurring needs for a particular type of resource distribution. For example, a site could use a standing reservation to reserve a subset of its compute resources for quick turnaround jobs during business hours on Monday thru Friday. Standing reservations are created and configured by specifying parameters in a configuration file.

As shown in FIG. 2A, the compute environment 202 includes standing reservations shown as 204A, 204B and 204C. These reservations show resources allocated and reserved on a periodic basis. These are, for example, consuming reservations meaning that cluster resources will be consumed by the reservation. These reservations are specific to a user or a group of users and allow the reserved resources to be also customized specific to the workload submitted by these users or groups. For example, one aspect of the invention is that a user may have access to reservation 204A and not only submit jobs to the reserved resources but request, perhaps for optimization or to meet preferred criteria as opposed to required criteria, that the resources within the reservation be modified by virtual partitioning or some other means to accommodate the particular submitted job. In this regard, this embodiment of the invention enables the user to submit and perhaps request modification or optimization within the reserved resources for that particular job. There may be an extra charge or debit of an account of credits for the modification of the reserved resources. The modification of resources within the reservation according to the particular job may also be performed based on a number of factors discussed herein, such as criteria, class, quality of service, policies etc.

Standing reservations build upon the capabilities of advance reservations to enable a site to enforce advanced usage policies in an efficient manner. Standing reservations provide a superset of the capabilities typically found in a batch queuing system's class or queue architecture. For example, queues can be used to allow only particular types of jobs access to certain compute resources. Also, some batch systems allow these queues to be configured so that they only allow this access during certain times of the day or week. Standing reservations allow these same capabilities but with greater flexibility and efficiency than is typically found in a normal queue management system.

Standing Reservations provide a mechanism by which a site can dedicate a particular block of resources for a special use on a regular daily or weekly basis. For example, node X could be dedicated to running jobs only from users in the accounting group every Friday from 4 to 10 PM. A standing reservation is a powerful means of controlling access to resources and controlling turnaround of jobs.

Another embodiment of reservation is something called a reservation mask, which allows a site to create "sandboxes" in which other guarantees can be made. The most common aspects of this reservation are for grid environments and personal reservation environments. In a grid environment, a remote entity will be requesting resources and will want to use these resources on an autonomous cluster for the autonomous cluster to participate. In many cases it will want to constrain when and where the entities can reserve or utilize resources. One way of doing that is via the reservation mask.

Figure 2B:
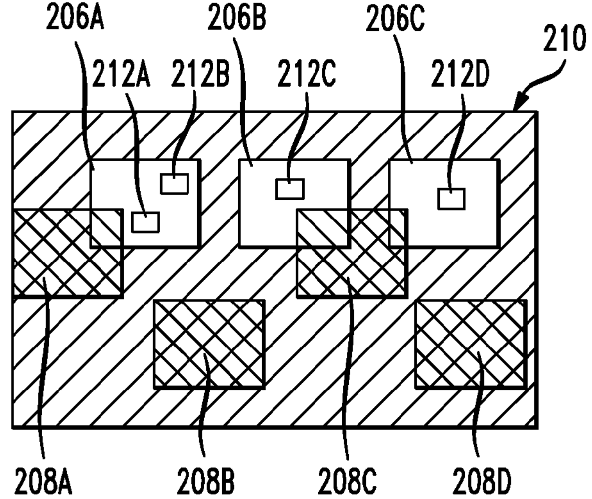
FIG. 2B illustrates a plurality of reservations and jobs submitted within those reservations.

FIG. 2B illustrates the reservation mask shown as creating sandboxes 206A, 206B, 206C in compute environment 210 and allows the autonomous cluster to state that only a specific subset of resources can be used by these remote requesters during a specific subset of times. When a requester asks for resources, the scheduler will only report and return resources available within this reservation, after which point the remote entity desires it, it can actually make a consumption reservation and that reservation is guaranteed to be within the reservation mask space. The consumption reservations 212A, 212B, 212C, 212D are shown within the reservation masks.

Another concept related to reservations is the personal reservation and/or the personal reservation mask. In compute environment 210, the reservation masks operate differently from consuming reservations in that they are enabled to allow personal reservations to be created within the space that is reserved. ACL's are independent inside of a sandbox reservation or a reservation mask in that you can also exclude other requesters out of those spaces so they're dedicated for these particular users.

One benefit of the personal reservation approach includes preventing local job starvation, and providing a high level of control to the cluster manager in that he or she can determine exactly when, where, how much and who can use these resources even though he doesn't necessarily know who the requesters are or the combination or quantity of resources they will request. The administrator can determine when, how and where requestors will participate in these clusters or grids. A valuable use is in the space of personal reservations which typically involves a local user given the authority to reserve a block of resources for a rigid time frame. Again, with a personal reservation mask, the requests are limited to only allow resource reservation within the mask time frame and mask resource set, providing again the administrator the ability to constrain exactly when and exactly where and exactly how much of resources individual users can reserve for a rigid time frame. The individual user is not known ahead of time but it is known to the system, it is a standard local cluster user.

The reservation masks 206A, 206B and 206C define periodic, personal reservation masks where other reservations in the compute environment 210 may be created, i.e., outside the defined boxes. These are provisioning or policy-based reservations in contrast to consuming reservations. In this regard, the resources in this type of reservation are not specifically allocated but the time and space defined by the reservation mask cannot be reserved for other jobs. Reservation masks enable the system to be able to control the fact that resources are available for specific purposes, during specific time frames. The time frames may be either single time frames or repeating time frames to dedicate the resources to meet project needs, policies, guarantees of service, administrative needs, demonstration needs, etc. This type of reservation insures that reservations are managed and scheduled in time as well as space. Boxes 208A, 208B, 208C and 208D represent non-personal reservation masks. They have the freedom to be placed anywhere in cluster including overlapping some or all of the reservation masks 206A, 206B, 206C. Overlapping is allowed when the personal reservation mask was setup with a global ACL. To prevent the possibility of an overlap of a reservation mask by a non-personal reservation, the administrator can set an ACL to constrain it is so that only personal consumption reservations are inside. These personal consumption reservations are shown as boxes 212B, 212A, 212C, 212D which are constrained to be within the personal reservation masks 206A, 206B, 206C. The 208A, 208B, 208C and 208D reservations, if allowed, can go anywhere within the cluster 210 including overlapping the other personal reservation masks. The result is the creation of a "sandbox" where only personal reservations can go without in any way constraining the behavior of the scheduler to schedule other requests.

All reservations possess a start and an end time which define the reservation's active time. During this active time, the resources within the reservation may only be used as specified by the reservation ACL. This active time may be specified as either a start/end pair or a start/duration pair. Reservations exist and are visible from the time they are created until the active time ends at which point they are automatically removed.

For a reservation to be useful, it must be able to limit who or what can access the resources it has reserved. This is handled by way of an access control list, or ACL. With reservations, ACL's can be based on credentials, resources requested, or performance metrics. In particular, with a standing reservation, the attributes userlist, grouplist, accountlist, classlist, qoslist, jobattrlist, proclimit, timelimit and others may be specified.

Figure 3:
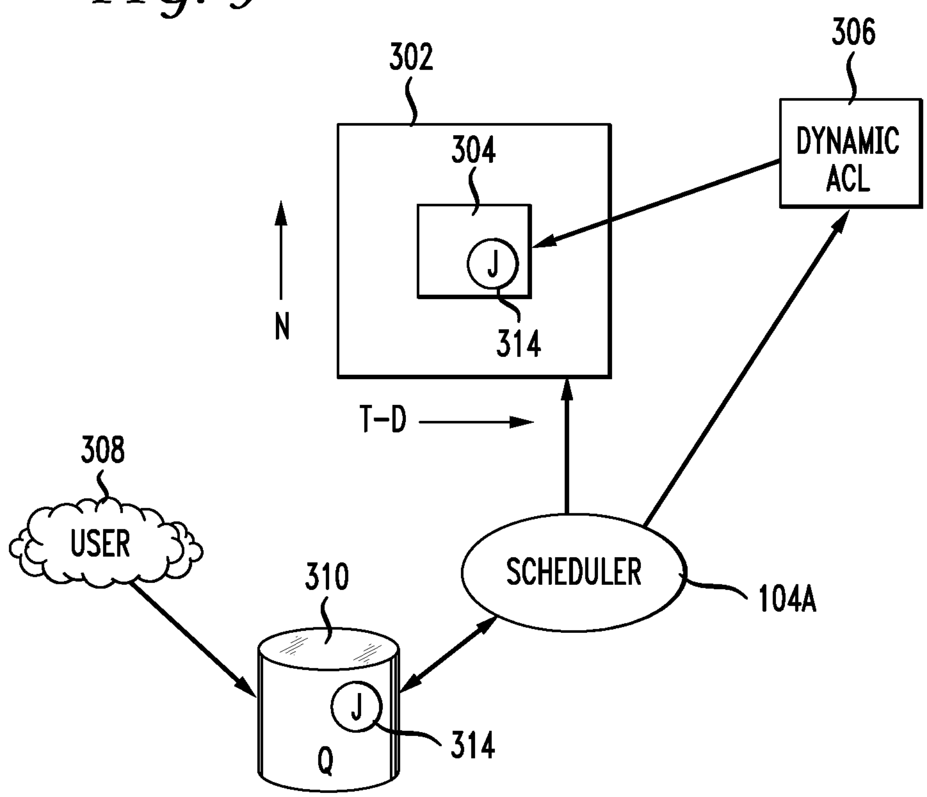
FIG. 3 illustrates a dynamic access control list.

FIG. 3 illustrates an aspect of the present invention that allows the ACL 306 for the reservation 304 to have a dynamic aspect instead of simply being based on who the requester is. The ACL decision-making process is based at least in part on the current level of service or response time that is being delivered to the requester. To illustrate the operation of the ACL 306, assume that a user 308 submits a job 314 to a queue 310 and that the ACL 306 reports that the only job that can access these resources 302 are those that have a queue time that currently exceeds two hours. The resources 302 are shown with resources N on the y axis and time on the x axis. If the job 314 has sat in the queue 310 for two hours it will then access the additional resources to prevent the queue time for the user 308 from increasing significantly beyond this time frame. The decision to allocate these additional resources can be keyed off of utilization of an expansion factor and other performance metrics of the job. For example, the reservation 304 may be expanded or contracted or migrated to cover a new set of resources.

Whether or not an ACL 306 is satisfied is typically and preferably determined the scheduler 104A. However, there is no restriction in the principle of the invention regarding where or on what node in the network the process of making these allocation of resource decisions occurs. The scheduler 104A is able to monitor all aspects of the request by looking at the current job 314 inside the queue 310 and how long it has sat there and what the response time target is and the scheduler itself determines whether all requirements of the ACL 306 are satisfied. If requirements are satisfied, it releases the resources that are available to the job 314. A job 314 that is located in the queue and the scheduler communicating with the scheduler 104A. If resources are allocated, the job 314 is taken from the queue 310 and inserted into the reservation 314 in the cluster 302.

An example benefit of this model is that it makes it significantly easier for a site to balance or provide guaranteed levels of service or constant levels of service for key players or the general populace. By setting aside certain resources and only making them available to the jobs which threaten to violate their quality of service targets, the system increases the probability of satisfying targets.

When specifying which resources to reserve, the administrator has a number of options. These options allow control over how many resources are reserved and where they are reserved at. The following reservation attributes allow the administrator to define resources.

An important aspect of reservations is the idea of a task. The scheduler uses the task concept extensively for its job and reservation management. A task is simply an atomic collection of resources, such as processors, memory, or local disk, which must be found on the same node. For example, if a task requires 4 processors and 2 GB of memory, the scheduler must find all processors AND memory on the same node; it cannot allocate 3 processors and 1 GB on one node and 1 processor and 1 GB of memory on another node to satisfy this task. Tasks constrain how the scheduler must collect resources for use in a standing reservation, however, they do not constrain the way in which the scheduler makes these cumulative resources available to jobs. A job can use the resources covered by an accessible reservation in whatever way it needs. If reservation X allocated 6 tasks with 2 processors and 512 MB of memory each, it could support job Y which requires 10 tasks of 1 processor and 128 MB of memory or job Z which requires 2 tasks of 4 processors and 1 GB of memory each. The task constraints used to acquire a reservation's resources are completely transparent to a job requesting use of these resources. Using the task description, the taskcount attribute defines how many tasks must be allocated to satisfy the reservation request. To create a reservation, a taskcount and/or a hostlist may be specified.

A hostlist constrains the set of resource which are available to a reservation. If no taskcount is specified, the reservation will attempt to reserve one task on each of the listed resources. If a taskcount is specified which requests fewer resources than listed in the hostlist, the scheduler will reserve only the number of tasks from the hostlist specified by the taskcount attribute. If a taskcount is specified which requests more resources than listed in the hostlist, the scheduler will reserve the hostlist nodes first and then seek additional resources outside of this list.

Reservation flags allow specification of special reservation attributes or behaviors. Supported flags are listed in table 2 below.

TABLE 2

| Flag Name | Description |
|---|---|
| BESTEFFORT | N/A |
| BYNAME | reservation will only allow access to jobs which meet reservation ACL's and explicitly request the resources of this reservation using the job ADVRES flag |
| IGNRSV | request will ignore existing resource reservations allowing the reservation to be forced onto available resources even if this conflicts with other reservations. |
| OWNERPREEMPT | job's by the reservation owner are allowed to preempt non-owner jobs using reservation resources |
| PREEMPTEE | Preempts a job or other object |
| SINGLEUSE | reservation is automatically removed after completion of the first job to use the reserved resources |
| SPACEFLEX | reservation is allowed to adjust resources allocated over time in an attempt to optimize resource utilization |
| TIMEFLEX | reservation is allowed to adjust the reserved timeframe in an attempt to optimize resource utilization |

Reservations must explicitly request the ability to float for optimization purposes by using a flag such as the SPACEFLEX flag. The reservations may be established and then identified as self-optimizing in either space or time. If the reservation is flagged as such, then after the reservation is created, conditions within the compute environment may be monitored to provide feedback on where optimization may occur. If so justified, a reservation may migrate to a new time or migrate to a new set of resources that are more optimal than the original reservation.

Figure 4:
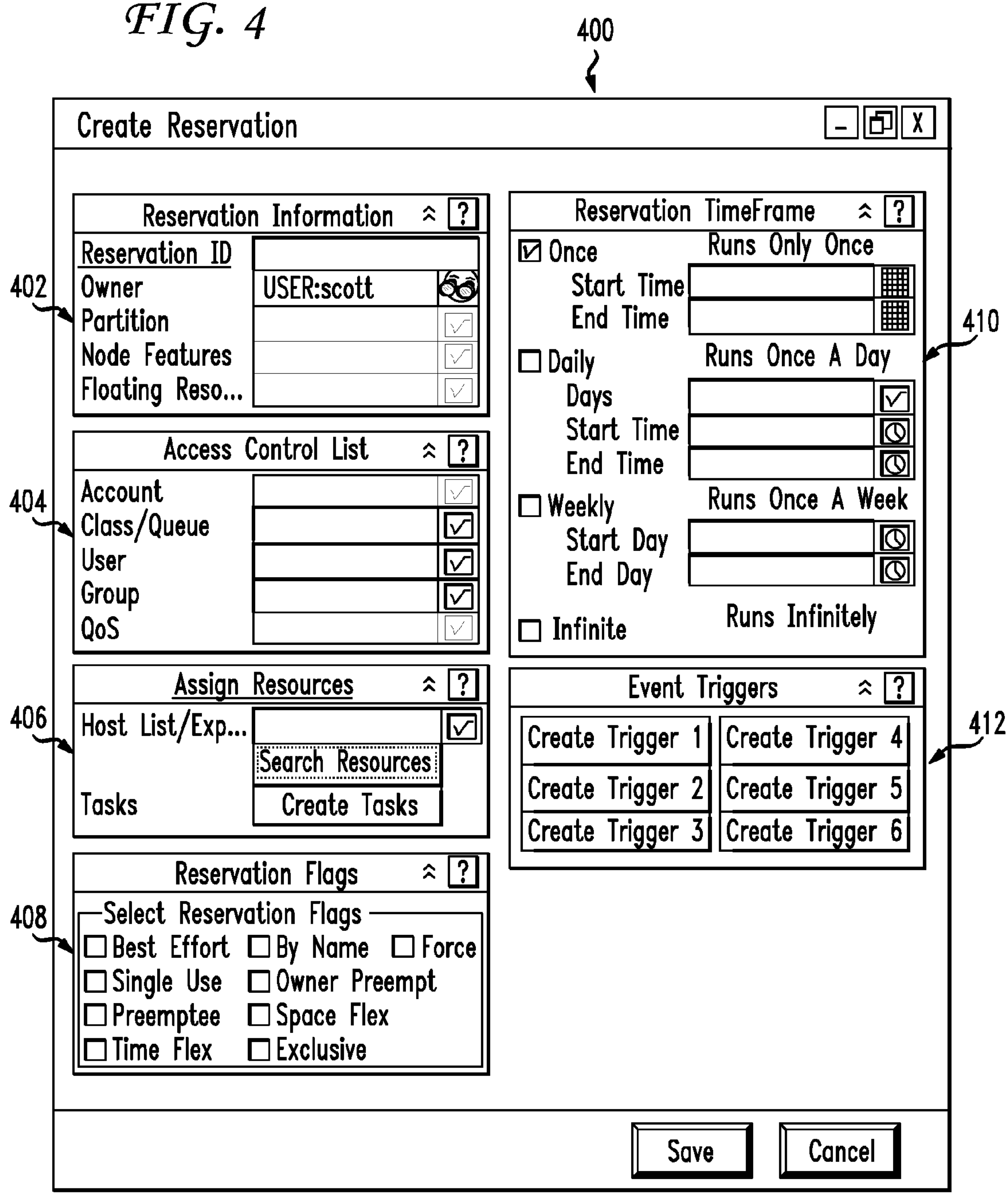
FIG. 4 illustrates a reservation creation window.

FIG. 4 illustrates a reservation creation window 400 that includes the use of the flags in Table 2. A user Scott input reservation information in a variety of fields 402 for name, partition, node features and floating reservation. Each of these input fields includes a drop-down menu to enable the selection of options easy. An access control list input field 404 allows the user to input an account, class/queue, user, group and QoS information. Resources may be assigned and searched and tasks created 406 and reservation flags set 408, such as best effort, single use, preemptee, time flex, by name, owner preempt, space flex, exclusive and force. These flags set parameters that may cause the reservation to be optimized such as in time or space where it migrates to a new time or over new resources based on monitored events or other feedback.

A reservation time-frame 410 may also be input such as one, daily, weekly, with start and end times for the reservation. Menu drop down calendars and clocks are available for easily enabling the user to view and graphically input and select the various timeframe parameters. Event triggers may also be input wherein the user can create one or more triggers associated with the reservation. As generally shown in FIG. 4, the use of a graphical interface simplifies the reservation-creation process for the administrator or user.

Figure 5:
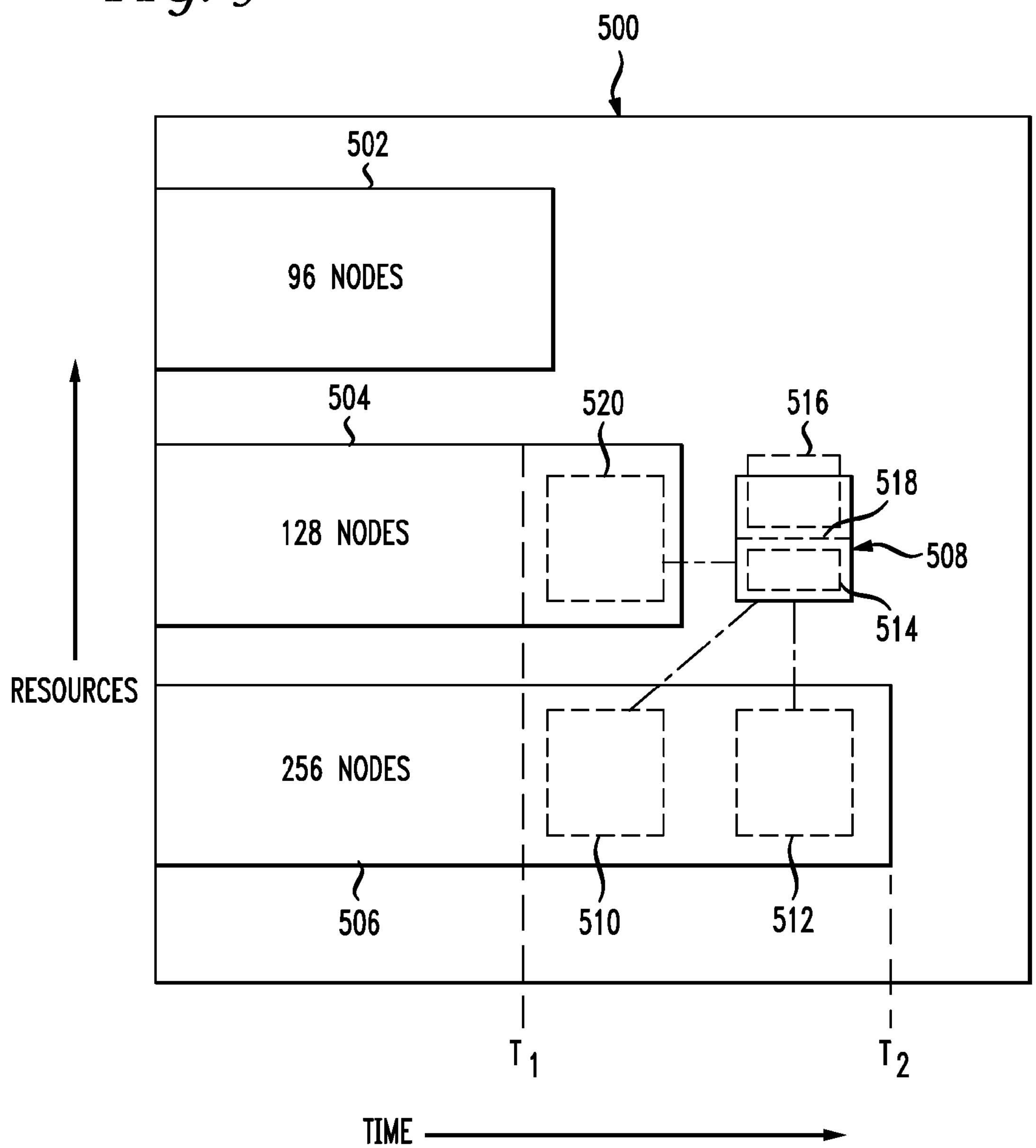
FIG. 5 illustrates a dynamic reservation migration process.

FIG. 5 illustrates a particular instance where the user has identified the time-flex and space-flex flags within the reservation. A window 500 identifies three reservations 502 for 96 nodes, 504 for 128 nodes and 506 for 256 nodes. The height of each of these reservations generally relates to resources reserved, such as a number of processors reserved or processors and disk space. The X-axis represents time. Reservation 508 represents a reservation in the future that will in a position to receive submitted jobs. Assume that reservation 506 which was scheduled to end at time T2 has finished early at time T1. Also assume that reservation 508 is flagged for time flex and space flex. In this case, based on the monitored event that reservation 506 has ended early, the system would cause reservation 508 to migrate in time (and space in this example) to position 510. This represents a movement of the reservation to a new time and a new set of resources. If reservation 504 ends early, and reservation 508 migrates to position 520, that would represent a migration in time (to an earlier time) but not in space. This would be enabled by the time-flex flag being set wherein the migration would seek to create a new reservation at the earliest time possible and/or according to available resources. The new time may be based on criteria to minimize the time for the reservation or to maximize usage of the overall resources or better performance of the compute environment.

Next, assume that reservation 508 is for 128 processors and reservation 506 is for 256 processors and reservation 508 is flagged for space flex. If reservation 506 ends are time T1 instead of time T2, then reservation 508 may migrate to position 512 to a reservation of 256 processors. The time frame of the starting and ending time may be the same but the reservation has migrated in space and thus been optimized.

In another aspect of reservation migration, assume that reservation 508 is set but that a node or a group of nodes that are part of the reservation go down or are projected to fail as represented by 518. In this regard, reservation 508 may be enabled to migrate as shown by 516 and 508 to cover new resources but to accommodate for the nodes that are no longer available.

Standing reservations allow resources to be dedicated for particular uses. This dedication can be configured to be permanent or periodic, recurring at a regular time of day and/or time of week. There is extensive applicability of standing reservations for everything from daily dedicated job runs to improved use of resources on weekends. All standing reservation attributes are specified via a parameter using available attributes In addition to standing and administrative reservations, a workload manager according to the invention can also create priority reservations. These reservations are used to allow the benefits of out-of-order execution (such as is available with a backfill feature) without the side effect of job starvation. Starvation can occur in any system where the potential exists for a job to be overlooked by the scheduler for an indefinite period. In the case of backfill, small jobs may continue to be run on available resources as they become available while a large job sits in the queue never able to find enough nodes available simultaneously to run on. To avoid such situations, priority reservations are created for high priority jobs which cannot run immediately. When making these reservations, the scheduler determines the earliest time the job could start, and then reserves these resources for use by this job at that future time. By default, only the highest priority job will receive a priority reservation. However, this behavior is configurable via a reservation depth policy. The workload manager's default behavior of only reserving the highest priority job allows backfill to be used in a form known as liberal backfill. This liberal backfill tends to maximize system utilization and minimize overall average job turnaround time. However, it does lead to the potential of some lower priority jobs being indirectly delayed and may lead to greater variance in job turnaround time. A reservation depth parameter can be set to a very large value, essentially enabling what is called conservative backfill where every job which cannot run is given a reservation. Most sites prefer the liberal backfill approach associated with the default reservation depth 1 or select a slightly higher value. It is important to note that to prevent starvation in conjunction with reservations, monotonically increasing priority factors such as queuetime or job x-factor should be enabled.

Another important consequence of backfill and reservation depth is its affect on job priority. In the workload manager, all jobs are preferably prioritized. Backfill allows jobs to be run out of order and thus, to some extent, job priority to be ignored. This effect, known as 'priority dilution' can cause many site policies implemented via workload manager prioritization policies to be ineffective. Setting the reservation depth parameter to a higher value will give job priority 'more teeth' at the cost of slightly lower system utilization. This lower utilization results from the constraints of these additional reservations, decreasing the scheduler's freedom and its ability to find additional optimizing schedules. Anecdotal evidence indicates that these utilization losses are fairly minor, rarely exceeding 8%.

In addition to the reservation depth parameter, sites also have the ability to control how reservations are maintained. The workload manager's dynamic job prioritization allows sites to prioritize jobs so that their priority order can change over time. It is possible that one job can be at the top of the priority queue for a time, and then get bypassed by another job submitted later. A reservation policy parameter allows a site to determine what how existing reservations should be handled when new reservations are made. The value "highest" will cause that all jobs which have ever received a priority reservation will maintain that reservation until they run even if other jobs later bypass them in priority value. The value of the parameter "current highest" will cause that only the current top <RESERVATIONDEPTH> priority jobs will receive reservations. If a job had a reservation but has been bypassed in priority by another job so that it no longer qualifies as being among the top <RESERVATIONDEPTH> jobs, it will lose its reservation. Finally, the value "never" indicates that no priority reservations will be made.

QOS-based reservation depths can be enabled via the reservation QOS list parameter. This parameter allows varying reservation depths to be associated with different sets of job QoS's. For example, the following configuration will create two reservation depth groupings:

```
----
RESERVATIONDEPTH[0] 8
RESERVATIONQOSLIST[0] highprio interactive debug
RESERVATIONDEPTH[1] 2
RESERVATIONQOSLIST[1] batch
----
```

This example will cause that the top 8 jobs belonging to the aggregate group of highprio, interactive, and debug QoS jobs will receive priority reservations. Additionally, the top 2 batch QoS jobs will also receive priority reservations. Use of this feature allows sites to maintain high throughput for important jobs by guaranteeing a significant proportion of these jobs are making progress toward starting through use of the priority reservation. The following are example default values for some of these parameters: RESERVATIONDEPTH[DEFAULT]=1;

RESERVATIONQOSLIST[DEFAULT]=ALL.

This allows one job with the highest priority to get a reservation. These values can be overwritten by modifying the default policy.

A final reservation policy is in place to handle a number of real-world issues. Occasionally when a reservation becomes active and a job attempts to start, various resource manager race conditions or corrupt state situations will prevent the job from starting. By default, the workload manager assumes the resource manager is corrupt, releases the reservation, and attempts to re-create the reservation after a short timeout. However, in the interval between the reservation release and the re-creation timeout, other priority reservations may allocate the newly available resources, reserving them before the original reservation gets an opportunity to reallocate them. Thus, when the original job reservation is re-established, its original resource may be unavailable and the resulting new reservation may be delayed several hours from the earlier start time. The parameter reservation retry time allows a site that is experiencing frequent resource manager race conditions and/or corruption situations to tell the workload manager to hold on to the reserved resource for a period of time in an attempt to allow the resource manager to correct its state.

Next we discuss the use of partitions. Partitions are a logical construct which divide available resources and any single resource (i.e., compute node) may only belong to a single partition. Often, natural hardware or resource manager bounds delimit partitions such as in the case of disjoint networks and diverse processor configurations within a cluster. For example, a cluster may consist of 256 nodes containing four 64 port switches. This cluster may receive excellent interprocess communication speeds for parallel job tasks located within the same switch but sub-stellar performance for tasks which span switches. To handle this, the site may choose to create four partitions, allowing jobs to run within any of the four partitions but not span them.

While partitions do have value, it is important to note that within the workload manager, the standing reservation facility provides significantly improved flexibility and should be used in the vast majority of politically motivated cases where partitions may be required under other resource management systems. Standing reservations provide time flexibility, improved access control features, and more extended resource specification options. Also, another workload manager facility called node sets allows intelligent aggregation of resources to improve per job node allocation decisions. In cases where system partitioning is considered for such reasons, node sets may be able to provide a better solution.

An important aspect of partitions over standing reservations and node sets is the ability to specify partition specific policies, limits, priorities, and scheduling algorithms although this feature is rarely required. An example of this need may be a cluster consisting of 48 nodes owned by the Astronomy Department and 16 nodes owned by the Mathematics Department. Each department may be willing to allow sharing of resources but wants to specify how their partition will be used. As mentioned earlier, many of the workload manager's scheduling policies may be specified on a per partition basis allowing each department to control the scheduling goals within their partition.

The partition associated with each node should be specified as indicated in the node location section. With this done, partition access lists may be specified on a per job or per QOS basis to constrain which resources a job may have access to. By default, QOS's and jobs allow global partition access. Note that by default, a job may only utilize resources within a single partition.

If no partition is specified, the workload manager creates one partition per resource manager into which all resources corresponding to that resource manager are placed. This partition may be given the same name as the resource manager. A partition preferably does not span multiple resource managers. In addition to these resource manager partitions, a pseudo-partition named [ALL] is created which contains the aggregate resources of all partitions. While the resource manager partitions are real partitions containing resources not explicitly assigned to other partitions, the [ALL] partition is only a convenience object and is not a real partition; thus it cannot be requested by jobs or included in configuration ACL's.

Node-to-partition mappings are established using a node configuration parameter as shown in this example:

```
NODECFG[node001] PARTITION=astronomy
NODECFG[node002] PARTITION=astronomy
...
NODECFG[node049] PARTITION=math
...
```

By default, the workload manager only allows the creation of 4 partitions total. Two of these partitions, DEFAULT, and [ALL], are used internally, leaving only two additional partition definition slots available. If more partitions will be needed, the maximum partition count should be adjusted. Increasing the maximum number of partitions can be managed.

Determining who can use which partition is specified using *CFG parameters (for example, these parameters may be defined as: usercfg, groupcfg, accountcfg, quoscfg, classcfg and systemcfg). These parameters allow both a partition access list and default partition to be selected on a credential or system wide basis using the PLIST and PDEF keywords. By default, the access associated with any given job is the logical or of all partition access lists assigned to the job's credentials. Assume a site with two partitions: general and test. The site management would like everybody to use the general partition by default. However, one user, Steve, needs to perform the majority of his work on the test partition. Two special groups, staff and mgmt will also need access to use the test partition from time to time but will perform most of their work in the general partition. The example configuration below will enable the needed user and group access and defaults for this site.

```
SYSCFG[base]    PLIST=
USERCFG[DEFAULT] PLIST=general
USERCFG[steve]  PLIST=general:test PDEF=test
GROUPCFG[staff]  PLIST=general:test PDEF=general
GROUPCFG[mgmt]   PLIST=general:test PDEF=general
```

By default, the system partition access list allows global access to all partitions. If using logically or based partition access lists, the system partition list should be explicitly constrained using the SYSCFG parameter. While using a logical or approach allows sites to add access to certain jobs, some sites prefer to work the other way around. In these cases, access is granted by default and certain credentials are then restricted from access various partitions. To use this model, a system partition list must be specified. See the example below:

```
SYSCFG[base]    PLIST=general,test&
USERCFG[demo]    PLIST=test&
GROUPCFG[staff]  PLIST=general&
```

In the above example, note the ampersand ('&'). This character, which can be located anywhere in the PLIST line, indicates that the specified partition list should be logically AND'd with other partition access lists. In this case, the configuration will limit jobs from user demo to running in partition test and jobs from group staff to running in partition general. All other jobs will be allowed to run in either partition. When using and based partition access lists, the base system access list must be specified with SYSCFG.

Users may request to use any partition they have access to on a per job basis. This is accomplished using the resource manager extensions, since most native batch systems do not support the partition concept. For example, on a PBS system, a job submitted by a member of the group staff could request that the job run in the test partition by adding the line '#PBS−W x=PARTITION:test' to the command file. Special jobs may be allowed to span the resources of multiple partitions if desired by associating the job with a QOS which has the flag 'SPAN' set.

The disclosure now continues to discuss reservations further. An advance reservation is the mechanism by which the present invention guarantees the availability of a set of resources at a particular time. With an advanced reservation a site now has an ability to actually specify how the scheduler should manage resources in both space and time. Every reservation consists of three major components, a list of resources, a timeframe (a start and an end time during which it is active), and the ACL. These elements are subject to a set of rules. The ACL acts as a doorway determining who or what can actually utilize the resources of the cluster. It is the job of the cluster scheduler to make certain that the ACL is not violated during the reservation's lifetime (i.e., its timeframe) on the resources listed. The ACL governs access by the various users to the resources. The ACL does this by determining which of the jobs, various groups, accounts, jobs with special service levels, jobs with requests for specific resource types or attributes and many different aspects of requests can actually come in and utilize the resources. With the ability to say that these resources are reserved, the scheduler can then enforce true guarantees and can enforce policies and enable dynamic administrative tasks to occur. The system greatly increases in efficiency because there is no need to partition the resources as was previously necessary and the administrative overhead is reduced it terms of staff time because things can be automated and scheduled ahead of time and reserved.

As an example of a reservation, a reservation may specify that node002 is reserved for user John Doe on Friday. The scheduler will thus be constrained to make certain that only John Doe's jobs can use node002 at any time on Friday. Advance reservation technology enables many features including backfill, deadline based scheduling, QOS support, and meta scheduling.

There are several reservation concepts that will be introduced as aspects of the invention. These include dynamic reservations, co-allocating reservation resources of different types, reservations that self-optimize in time, reservations that self-optimization in space, reservations rollbacks and reservation masks. The present invention relates to a system and method of providing dynamic reservations in a compute environment. Dynamic reservations are reservations that are able to be modified once they are created. The workload manager allows dynamic modification of most scheduling parameters allowing new scheduling policies, algorithms, constraints, and permissions to be set at any time. For example, a reservation may be expanded or contracted after a job is submitted to more closely match the reservation to the workload. Changes made via client commands are preferably temporary and will be overridden by values specified in a config files the next time the workload manager is shutdown and restarted.

Various commands may be used manually or automatically to control reservations. Examples of such commands and their function are illustrated in Table 3:

TABLE 3

| | | |
|---|---|---|
| mdiag | -r | display summarized reservation information and any |
| mrsvctl | | unexpected state reservation control |
| mrsvctl | -r | remove reservations |
| mrsvctl | -c | create an administrative reservation |
| showres | | display information regarding location and state of reservations |

We now turn to the particular features of the present invention that relate to a system, method and computer readable medium for managing future policy enforcement within a compute environment. The method will be typically practiced by a "system" or a computing device programmed to operate and practice the steps of the method embodiment of the invention. For example the system may have program modules configured to carry out the particular instructions associated with the invention.

Figure 6A:
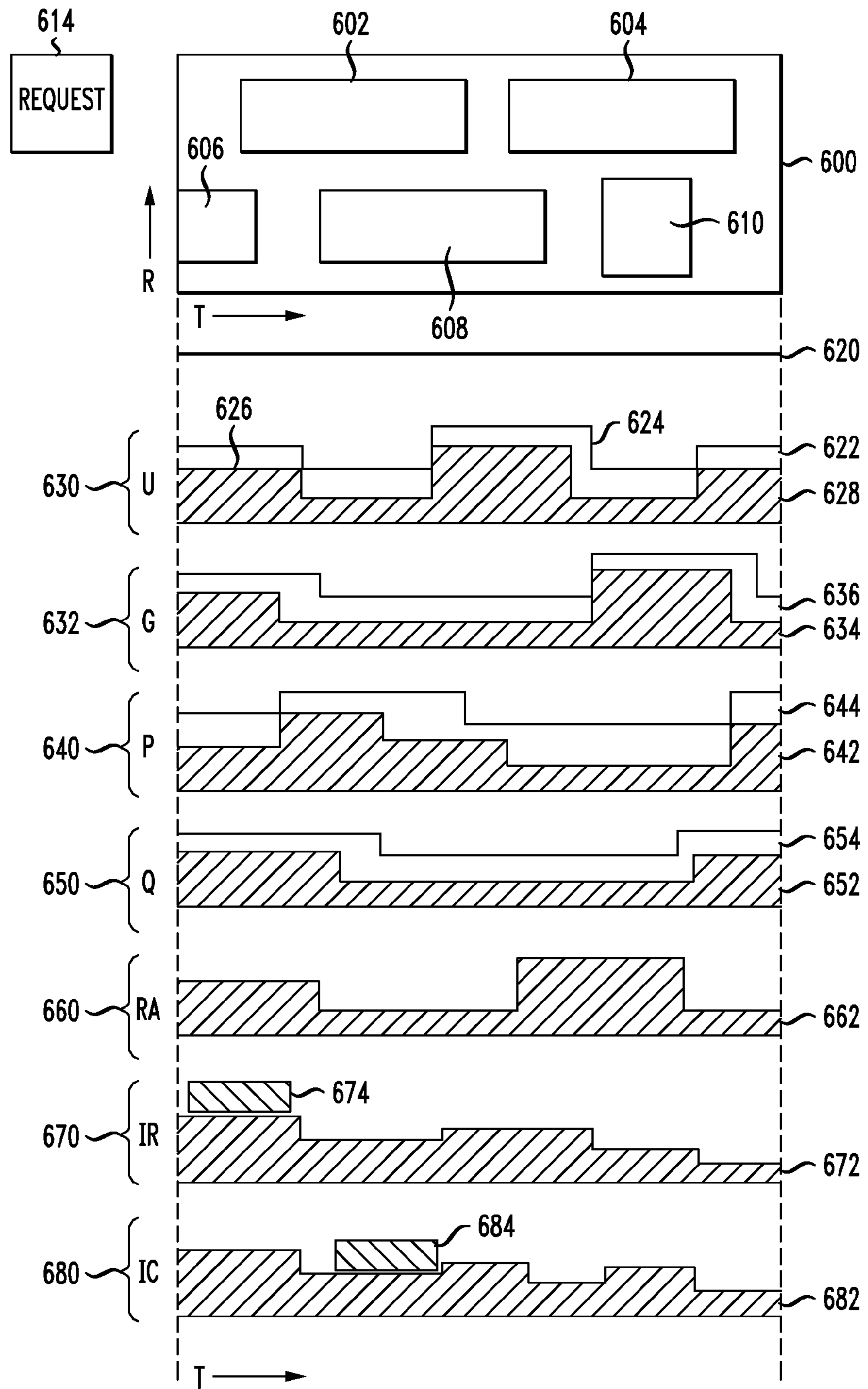
FIGS. 6A-C illustrate examples of various concepts associated with an embodiment.

FIG. 6A illustrates a compute environment 600 having various reservations therein 602, 604, 606, 608, 610. The compute environment represents a node space map of jobs and reservations that exist within the environment. Generally, resources are represented on the y axis and time on the x axis. Each of the reservations has a set of credentials, such as, for example, credentials associated with a user, a group, processors, nodes, quality of service, licensing rights and so forth. As an example, a user may have a "credential" that requires that the user never be able to reserve or consume more than 10 processors at a single time. Feature 620 represents the limit on or policy associated with the particular credential. Each row should be considered as having a maximum value for the respective credential. The method embodiment of the invention is shown in FIG. 7 and will be discussed with reference to both FIG. 6A, FIG. 6B and FIG. 7.

The method relates to managing future policy enforcement within a compute environment and comprises receiving a request for resources (702) which is shown in FIG. 6A as feature 614. The request 614 may be from a user or a group and may relate to a job, a reservation associated with an existing job or some other object. Associated with the request 614 are a series of credentials including, but not limited to, a limit on the total quantity of requests and limits on the number of resources that may be available to any given credential at any given time. This limit is represented as feature 620. For example, a user may be limited to having three jobs running at any given time on the compute resources or limited to a particular quality of service and so forth. The goal of the method is to allocated resources for the request at an optimized time within the computer environment 600 so that no policies are violated. The optimization of the allocation may be in terms of time or may be based on another parameter such as quality of service, efficient use of resources as determined by an administrator, user, or other entity, a credential of a user or a group and so forth.

The method comprises generating a mapping for each credential (704) that indicates a total number of reserved resources and consumed resources at any given time frame considered. The mapping is preferably time-based. Reserved resources 622 are resources that are made available for a user to submit jobs. A mapping of consumed resources 628 indicates what resources will be consumed by submitted jobs. In FIG. 6A, a mapping of the number of resources consumed by a user is shown by feature 630 with graph 626. In each of these mappings, resources are on the y axis and time is on the x axis. Graph 624 illustrates the reserved resources for the user 630. Other credential maps are shown as well for group 632 illustrating a mapping 634 for consumed resources and a mapping for reserved resources 636, processors 640 illustrating consumed resources mapping 642 and reserved resources mapping 644 and a quality of service ("Q") 650 mapping illustrating consumed resource mapping 652 and reserved resource mapping 654.

For each credential map, the system generates a resource availability map (706) such as that shown in FIG. 6A as feature 660. This map identifies the times and quantity of resources 662 that are available independent of any policies. In one aspect of the invention, the system generates a resource availability map for each credential. The system generates a first composite intersecting map for a first resource type and a second composite intersecting map for a second resource type (708). For example, the first composite intersecting map for the first type of resource may relate to intersecting the resource availability map 660 with each of the reserved resource mappings (622, 636, 644, 654) from the credential maps, thus generating an "IR" mapping or an intersecting reservation map. The second composite intersecting map for the second type of resource may relate to intersecting the resource availability map and the mapping of consumed resources (628, 634, 642, 652) for each credential map. It is noted that the composite maps also may comprise each credential mapping intersecting with each other credential mapping and the resource availability mapping 660 to generate the composite intersecting reservation mapping 672 or composite intersecting consumed resources mapping 682.

The system then seeks to utilize these composite intersecting mappings to allocate resources for the new request that optimizes a parameter. For example, the parameter may be time wherein the system seeks to allocate resources as soon as possible to accommodate the request or the job. The system may identify a possible time for allocating resources based on either the first composite map or the second composite map. For example, an allocation may be identified 674 that can start almost immediately based on a composite mapping 670 of reserved resources 672. Similarly, the system may also identify a time and amount of resources 684 based on an intersecting composite mapping 680 of consumed resources 682.

In the case of using the consumed mapping first, the system may locate an earliest or best time that satisfies the consumed mapping. The resources will then be any combination of reserved resources and unreserved resources that satisfy credential constraints. Therefore, the system has identified at the least a combination of resources that may be allocated to handle the request. After checking against the consumed mapping to identify a group of resources that may be allocated at a particular time, the system then may check for allocations against the reserved mapping at the same time. If the allocation favorably compares with the reserve mapping, meaning that the allocation overlaps completely with the non-consumed but reserved mapping, then the system can allocate resources at whatever time is best and can "go" anywhere within the compute environment within the reserved space. If there are not enough reserved resources, then the system must allocate new resources with constraints as will be explained further below.

Figure 6B:
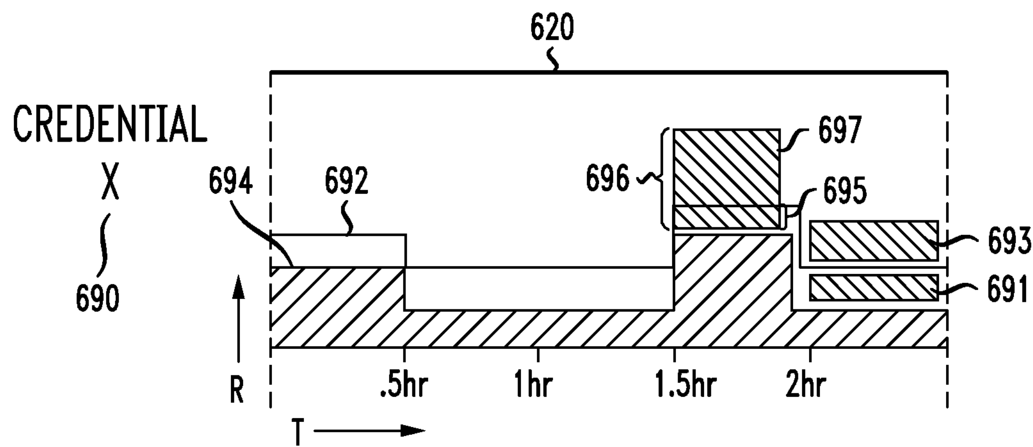

The system will seek to optimize either the time or other parameter for allocating resources, that maintains all the policies and credentials that are in place, by utilizing the composite intersection mappings. The system may do this in any number of ways and an example includes the following. The system will identify or determine based on one of the first composite map or the second composite map (710). For example, as shown in FIG. 6B, the allocation 693 may be identified as an allocation that may begin 2 hours from the present time and not overlap any previously reserved resources 692 and any consumed resources 694. Allocation 691 identifies resources that are previously reserved. The system may, in one aspect of the invention, give preference to an allocation of previously reserved resources 691 because that user or group already "owns" those resources and no new resources would have to be reserved or allocated to handle the request 614 or jobs submitted based on the request. In this case, the allocation can be performed without any credential constraints because all of the identified resources were previously reserved and therefore automatically conforming to constraints for that user or group. Therefore, if the identified resources do not overlap with consumed resources, and do not overlap with available resources, the system may just proceed to allocate the resources 691 for the request 614 wherein the allocation algorithm has complete freedom to allocate the resources at whatever time is best or based on any other parameter.

However, even if allocation 691 can provide a resource allocation without constraints, the system may further determine whether an allocation may be made that is improved in some manner, such as time wherein the time at which a job may be submitted and consume may be moved closer to the present time, which requires some further analysis. The allocation 697 is earlier in time and is shown as starting 1.5 hours in the future. However, this new allocation is shown as partially covering previously reserved resources and would require a new allocation or a new reservation of resources. In this case, the allocation does not overlap consumed resources but new resources would have to be reserved. As shown in FIG. 6B, the total resources for the allocation 696 includes a portion of previously reserved resources 695. Subtracting the previously reserved resources 695 from the total amount 696 will provide the resources that need to be newly reserved. If the system determines to optimize the time of the allocation in this manner, the system then reserves or allocates the new resources according to the set of credentials such that no policies are violated.

Figure 6C:
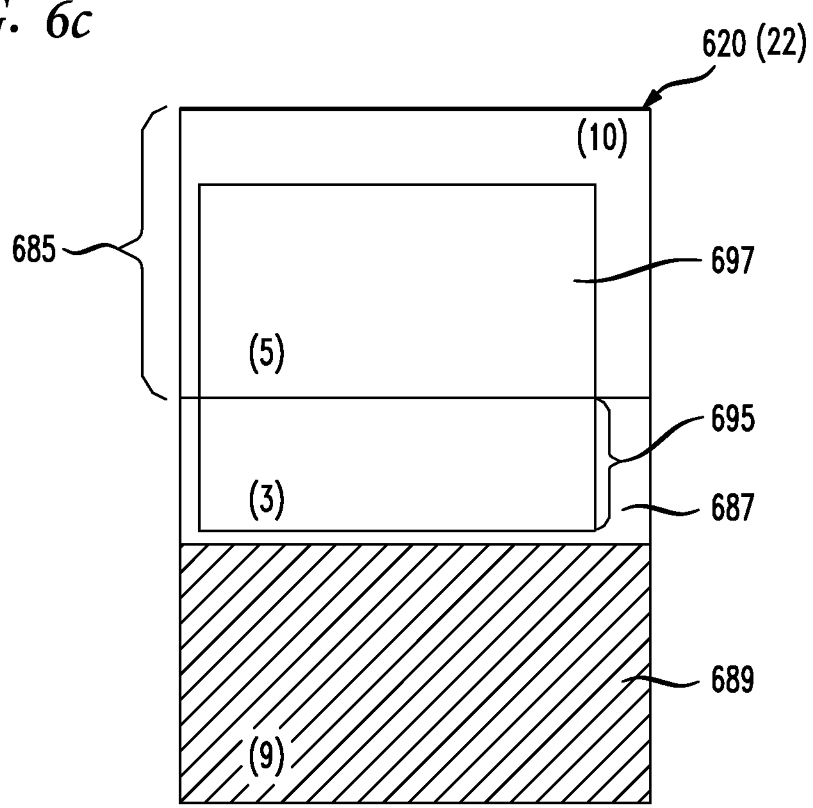

FIG. 6C illustrates an example of identifying how many "n" number of new resources the system should reserve. For example, assume that allocation 697 requires 8 processors and allocation 687 represents a portion of the previously reserved processors that are not to be consumed by submitted jobs. Feature 689 represents 9 consumed processors. The limit 620 is 22 processors for the requestor. Resources 685 are shown as 10 non-reserved and processors available according to the credentials of the requestor. To identify how many un-reserved processors (or any other resource) to allocate, the system identifies that there are 22 total processors minus the 12 total reserved. Of those 12, only three are identified as not being consumed and thus available for the request. The allocation 697 would require 8 processors, therefore, the system determines that 5 unreserved processors would have to be reserved for the request. Therefore, three processors may be allocated for the request without constraints and 5 new processors must be newly reserved for the request but will be reserved with constraints. It is also preferred that an allocation algorithm in this case utilize as many of the previously reserved resources as possible in the allocation 697.

FIG. 6B also shows a space available at one hour for reservations in the mapping. However, allocation 697 is shown as being 1.5 hours into the future to demonstrate that if a policy existed where the requestor could not reserve resources sooner than 1.5 hours into the future, then to enforce the policy for that user, the earliest time that the reservation for request 614 may be made is at 1.5 hours as shown for allocation 697.

After performing the analysis above, and after optimizing a parameter such as time for identifying a time and an amount of resources that may be used to satisfy the request 614, the system will allocate resources within the compute environment based on at least one of the first or the second composite mappings (712). Other composite mappings may also be utilized to further optimize the time and allocation of resources. For example, more than two composite maps may be generated as part of the analysis to identify resources, comply with credentials and policies, and optimize reservations.

Another aspect of the invention shown in FIGS. 6 and 7 relates to identifying the earliest time that all policies may be satisfied after the intersection of each policy credential with the resource availability map 638 and assuming based on statistics a placement of a new resource availability. This can achieve a high percentage of success and where the assumption is incorrect, in other words where an assumption that a resource is available for a job turns out to be incorrect because the resource is reserved or will be consumed by a submitted job, the system can dynamically adjust the new reservation to avoid the newly identified conflict.

One advantage of the invention is that it enables the system to analyze resources for the request based on a mapping of reserved resources and then identify a possible allocation. For example, a time frame for starting a job on the resources in two hours that provides no constraints for the allocation algorithm. This is illustrated by feature 693. Then the system can generate a composite mapping of the consumed resources and possibly identify a sooner time or other improved parameter for the allocation, even if it is under a set of constraints fully or partially. For example, moving the allocation forward in time may require reserving new resources not previously reserved for the requestor. Those resources will be reserved according to the known constraints. If a portion of the resources for the allocation were previously reserved for the requestor, then no constraints are needed for that portion of the allocation.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

I claim:

1. A method comprising:

establishing a standing reservation via a workload manager for compute resources within a compute environment, wherein the standing reservation is periodic and comprises a first reservation of a group of compute resources at a first time to yield a first group of reserved compute resources and a second reservation of the group of compute resources at a second time to yield a second group of reserved compute resources;

receiving a request for compute resources to process workload in the standing reservation;

receiving, with the request, an optimization request for the workload, wherein the optimization request causes the workload manager to analyze the compute environment for opportunities to modify, prior to the compute environment processing the workload, one of the first group of reserved compute resources and the second group of reserved compute resources in terms of one of space or time to improve performance of the compute environment when the compute environment processes the workload relative to a configuration of the compute environment under the standing reservation at a time the request for compute resources was received;

modifying, via virtual partitioning, one of the first group of reserved compute resources and the second group of reserved compute resources according to the optimization request to yield a modified group of compute resources; and inserting the workload into the modified group of compute resources for processing.

2. The method of claim 1, wherein the workload manager receives requests for the compute resources in the compute environment and makes reservations for the compute resources to accommodate the requests.

3. The method of claim 1, wherein the standing reservation is created and configured by specifying parameters in a configuration file.

4. The method of claim 1, wherein the optimization request for the workload has one of a required criteria, a preferred criteria, and both the required criteria and the preferred criteria.

5. The method of claim 1, wherein the virtual partitioning comprises making modifications based on one of criteria, class, quality of service, and policies.

6. The method of claim 5, wherein the virtual partitioning comprises modifying one of the first group of reserved compute resources, the second group of reserved compute resources, and both the first group of reserved compute resources and the second group of reserved compute resources.

7. The method of claim 1, wherein the user is a group of users.

8. A system comprising a processor; and a computer-readable medium storing instructions, which, when executed by the processor, cause the processor to perform operations comprising:

establishing a standing reservation via a workload manager for compute resources within a compute environment, wherein the standing reservation is periodic and comprises a first reservation of a group of compute resources at a first time to yield a first group of reserved compute resources and a second reservation of the group of compute resources at a second time to yield a second group of reserved compute resources;

receiving a request for compute resources to process workload in the standing reservation;

receiving, with the request, an optimization request for the workload, wherein the optimization request causes the workload manager to analyze the compute environment for opportunities to modify, prior to the compute environment processing the workload, one of the first group of reserved compute resources and the second group of reserved compute resources in terms of one of space or time to improve performance of the compute environment when the compute environment processes the workload relative to a configuration of the compute environment under the standing reservation at a time the request for compute resources was received;

modifying, via virtual partitioning, one of the first group of reserved compute resources and the second group of reserved compute resources according to the optimization request to yield a modified group of compute resources; and inserting the workload into the modified group of compute resources for processing.

9. The system of claim 8, wherein the workload manager receives requests for the compute resources in the compute environment and makes reservations for the compute resources to accommodate the requests.

10. The system of claim 8, wherein the standing reservation is created and configured by specifying parameters in a configuration file.

11. The system of claim 8, wherein the optimization request for the workload has one of a required criteria, a preferred criteria, and both the required criteria and the preferred criteria.

12. The system of claim 8, wherein the virtual partitioning comprises making modifications based on one of criteria, class, quality of service, and policies.

13. The system of claim 12, wherein the virtual partitioning comprises modifying one of the first group of reserved compute resources, the second group of reserved compute resources, and both the first group of reserved compute resources and the second group of reserved compute resources.

14. The system of claim 8, wherein the user is a group of users.

15. A computer-readable storage device storing instructions for controlling a computing device to process a request for resources within a compute environment, the instructions, when extracted by the computing device, cause the computing device to perform operations comprising:

establishing a standing reservation via a workload manager for compute resources within a compute environment, wherein the standing reservation is periodic and comprises a first reservation of a group of compute resources at a first time to yield a first group of reserved compute resources and a second reservation of the group of compute resources at a second time to yield a second group of reserved compute resources;

receiving a request for compute resources to process workload in the standing reservation;

receiving, with the request, an optimization request for the workload wherein the optimization request causes the workload manager to analyze the compute environment for opportunities to modify, prior to the compute environment processing the workload, one of the first group of reserved compute resources and the second group of reserved compute resources in terms of one of space or time to improve performance of the compute environment when the compute environment processes the workload relative to a configuration of the compute environment under the standing reservation at a time the request for compute resources was received;

modifying, via virtual partitioning, one of the first group of reserved compute resources and the second group of reserved compute resources according to the optimization request to yield a modified group of compute resources; and inserting the workload into the modified group of compute resources for processing.

16. The computer-readable storage device of claim 15, wherein the standing reservation is created and configured by specifying parameters in a configuration file.

17. The computer-readable storage device of claim 15, wherein the optimization request for the workload has one of a required criteria, a preferred criteria, and both the required criteria and the preferred criteria.

18. The computer-readable storage device of claim 15, wherein the virtual partitioning comprises making modifications based on one of criteria, class, quality of service, and policies.

19. The computer-readable storage device of claim 18, wherein the virtual partitioning comprises modifying one of the first group of reserved compute resources, the second group of reserved compute resources, and both the first group of reserved compute resources and the second group of reserved compute resources.

20. The computer-readable storage device of claim 15, wherein the user is a group of users.

* * * * *